United States Patent
Gao et al.

(10) Patent No.: US 11,184,904 B2
(45) Date of Patent: Nov. 23, 2021

(54) CROSS-STANDARD SCHEDULING METHOD AND BASE STATION

(71) Applicant: HUAWEI TECHNOLOGIES CO., LTD., Guangdong (CN)

(72) Inventors: Quanzhong Gao, Shanghai (CN); Lin Zhou, Shanghai (CN); Shuai Chen, Shanghai (CN); Wei Chen, Shanghai (CN); Xiaojun Zheng, Shanghai (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 14 days.

(21) Appl. No.: 16/746,191

(22) Filed: Jan. 17, 2020

(65) Prior Publication Data
US 2020/0154454 A1    May 14, 2020

Related U.S. Application Data

(63) Continuation of application No. PCT/CN2018/085629, filed on May 4, 2018.

(30) Foreign Application Priority Data

Jul. 19, 2017    (CN) .......................... 201710593177.0

(51) Int. Cl.
*H04W 72/12*    (2009.01)
*H04B 7/06*    (2006.01)
(Continued)

(52) U.S. Cl.
CPC ........ *H04W 72/121* (2013.01); *H04B 7/0697* (2013.01); *H04L 5/0051* (2013.01); *H04L 25/0226* (2013.01); *H04W 72/042* (2013.01)

(58) Field of Classification Search
CPC ............ H04W 72/121; H04W 72/042; H04W 74/0816; H04W 74/085; H04W 16/14;
(Continued)

(56) References Cited

U.S. PATENT DOCUMENTS

2014/0066061 A1* 3/2014 Lou ........................ H04W 48/16
455/434
2015/0092669 A1* 4/2015 Chen ................... H04W 52/244
370/329
(Continued)

FOREIGN PATENT DOCUMENTS

CN       102665282 A     9/2012
CN       102685910 A     9/2012
(Continued)

*Primary Examiner* — Jung Liu
(74) *Attorney, Agent, or Firm* — Womble Bond Dickinson (US) LLP

(57) ABSTRACT

Embodiments of this application disclose a cross-standard scheduling method and a base station, used for unified scheduling of UEs in different standards by using a unified scheduler, to achieve space division multiplexing of a spectrum resource, where different standards may share the spectrum resource. A unified scheduler is disposed in the base station in the embodiments of this application. The method and the base station may obtain downlink channel information of UEs operating using different standards and in overlapping coverage range. The method and the base station may determine a scheduling result using the unified scheduler based on the obtained downlink channel information of the UEs. The method and the base station may schedule the UEs based on the scheduling result.

20 Claims, 5 Drawing Sheets

(51) Int. Cl.
*H04L 5/00* (2006.01)
*H04L 25/02* (2006.01)
*H04W 72/04* (2009.01)

(58) Field of Classification Search
CPC .......... H04W 72/1226; H04W 72/1273; H04B 7/0697; H04L 5/0048; H04L 5/0094; H04L 5/0051; H04L 25/0226; H04L 5/0037; H04L 5/0005
See application file for complete search history.

(56) References Cited

U.S. PATENT DOCUMENTS

| | | | | |
|---|---|---|---|---|
| 2015/0372792 | A1* | 12/2015 | Damnjanovic | H04L 5/0048 370/329 |
| 2017/0279580 | A1* | 9/2017 | Chen | H04L 5/0094 |
| 2017/0290041 | A1* | 10/2017 | Alvarino | H04W 52/325 |
| 2017/0366311 | A1* | 12/2017 | Iyer | H04B 7/0482 |
| 2018/0234930 | A1* | 8/2018 | Chen | H04W 72/005 |
| 2018/0241446 | A1* | 8/2018 | Fakoorian | H04B 7/0854 |
| 2018/0302201 | A1* | 10/2018 | Yoo | H04L 5/0048 |
| 2018/0368199 | A1* | 12/2018 | Zeng | H04W 88/10 |
| 2019/0109732 | A1* | 4/2019 | Choi | H04W 72/04 |
| 2020/0177342 | A1* | 6/2020 | Pawar | H04L 5/0007 |

FOREIGN PATENT DOCUMENTS

| | | |
|---|---|---|
| CN | 104980932 A | 10/2015 |
| CN | 107396450 A | 11/2017 |
| EP | 2525623 A2 | 11/2012 |
| WO | 2010077318 A1 | 7/2010 |

* cited by examiner

CROSS-STANDARD SCHEDULING METHOD AND BASE STATION

CROSS-REFERENCE TO RELATED APPLICATIONS

This application is a continuation of International Application No. PCT/CN2018/085629, filed on May 4, 2018, which claims priority to Chinese Patent Application No. 201710593177.0, filed on Jul. 19, 2017, the disclosures of the aforementioned applications are herein incorporated by reference in their entireties.

TECHNICAL FIELD

This application relates to the communications field, and in particular, to a cross-standard scheduling method and a base station.

BACKGROUND

Spectrum resources are important wireless resources. With the rapid development of mobile communications technologies and continuous evolution of wireless technologies, spectrum efficiency keeps increasing, and with the evolution of multiple-antenna technologies, a quantity of antennas in abase station keeps increasing. An earlier-standard system is deployed relatively early, has many inventory users, and continues to evolve. Moreover, from a perspective of protecting investment of an operator, an earlier-standard system is usually hard to return frequency spectrum resources completely.

In the prior art, different standards generally share a spectrum resource in a frequency division or time division manner, including: a static manner in which a first standard returns some frequency spectrum for a second standard, achieving an objective of standard evolution and spectrum efficiency improvement; and a dynamic manner in which in a time division manner, different standards occupy same frequency spectrum at different time, or frequency spectrum is dynamically allocated to the two standards to perform frequency division multiplexing between standards. In the prior art, different standards cannot flexibly multiplex a spectrum resource. A new standard cannot be deployed before a standard returns frequency spectrum resources. Inflexible deployment results in an unsmooth evolution between standards.

SUMMARY

Embodiments of this application provide a cross-standard scheduling method and a base station, used for unified scheduling of user equipment (UEs) in different standards by using a unified scheduler, to achieve space division multiplexing of a spectrum resource, where different standards may share the spectrum resource.

According to a first aspect, an embodiment of this application provides a cross-standard scheduling method, where the method is applied to a base station, a unified scheduler is disposed in the base station, and the method specifically includes: obtaining, by the base station, first downlink channel information of first user equipment (UE) and second downlink channel information of second UE, where the first UE is UE of a first standard, the second UE is UE of a second standard, the first standard and the second standard have an overlapping coverage range, and the first UE and the second UE exist in the coverage range; then determining a scheduling result by using the unified scheduler in the base station based on the obtained first downlink channel information and the second downlink channel information; and finally scheduling the first UE and the second UE based on the scheduling result. This embodiment of this application provides a cross-standard scheduling method, capable of unified scheduling of UEs in different standards by using the unified scheduler, to achieve space division multiplexing of a spectrum resource, where different standards may share the spectrum resource.

In a first embodiment of the first aspect of this application, the obtaining first downlink channel information of first UE and second downlink channel information of second UE includes: directly obtaining the first downlink channel information and the second downlink channel information by using the unified scheduler disposed in the base station. This embodiment of this application specifically describes how the base station obtains the first downlink channel information and the second downlink channel information, thereby improving operability and integrity of the embodiments of this application.

In a second embodiment of the first aspect of this application, a first standard scheduler and a second standard scheduler are further disposed in the base station. The obtaining first downlink channel information of first UE and second downlink channel information of second UE includes: obtaining, by the base station, the first downlink channel information of the first UE by using the built-in first standard scheduler, and sending the obtained first downlink channel information to the unified scheduler; and obtaining the second downlink channel information of the second UE by using the second standard scheduler, and sending the obtained second downlink channel information to the unified scheduler. This embodiment of this application specifically describes how the base station obtains the first downlink channel information and the second downlink channel information, thereby improving operability and integrity of the embodiments of this application.

In a third embodiment of the first aspect of this application, before the scheduling the first UE and the second UE based on the scheduling result, the method further includes: sending, by the unified scheduler, after the unified scheduler obtains the scheduling result based on the first downlink channel information and the second downlink channel information, the scheduling result to the first standard scheduler and the second standard scheduler. This embodiment of this application adds an operation before the base station schedules the first UE and the second UE based on the scheduling result, making the operations more comprehensive and improving operability of the embodiments of this application.

In a fourth embodiment of the first aspect of this application, after the obtaining first downlink channel information of first UE and second downlink channel information of second UE, the method further includes: sending, by the base station, the first downlink channel information to the unified scheduler by using the first standard scheduler; and sending the second downlink channel information to the unified scheduler by using the second standard scheduler. This embodiment of this application adds an operation after obtaining the first downlink channel information of the first UE and the second downlink channel information of the second UE, making the operations more comprehensive and improving operability of the embodiments of this application.

In a fifth embodiment of the first aspect of this application, the determining a scheduling result based on the first downlink channel information and the second downlink channel information includes: determining, by the base station, after receiving the first downlink channel information and the second downlink channel information, the scheduling result based on the first downlink channel information, the second downlink channel information, and a scheduling queue. This embodiment of this application describes how the base station determines the scheduling result, making the embodiments of this application more comprehensive.

According to a second aspect, an embodiment of this application provides a base station, where a unified scheduler is disposed in the base station, and the base station includes:

an obtaining unit, configured to obtain first downlink channel information of first user equipment (UE) and second downlink channel information of second UE, where the first UE is UE of a first standard, the second UE is UE of a second standard, the first standard and the second standard have an overlapping coverage, and the first UE and the second UE exist in the coverage;

a determining unit, configured to determine a scheduling result by using the unified scheduler based on the first downlink channel information and the second downlink channel information; and a scheduling unit, configured to schedule the first UE and the second UE based on the scheduling result.

This embodiment of this application provides a cross-standard unified scheduler, in which even if different standards do not need to return frequency spectrum resources, unified scheduling of UEs is implemented in different standards by using a unified scheduler, to achieve space division multiplexing of a spectrum resource, where different standards may share the spectrum resource.

In a first embodiment of the second aspect of this application, the obtaining unit includes:

a first obtaining subunit, configured to obtain the first downlink channel information and the second downlink channel information by using the unified scheduler.

In a second embodiment of the second aspect of this application, the obtaining unit includes:

a second obtaining subunit, configured to obtain the first downlink channel information by using a first standard scheduler; and a third obtaining subunit, configured to obtain the second downlink channel information by using a second standard scheduler.

This embodiment of this application specifically describes how the base station obtains the first downlink channel information and the second downlink channel information, thereby improving operability and integrity of the embodiments of this application.

In a third embodiment of the second aspect of this application, the base station further includes:

a first sending unit, configured to send the first downlink channel information to the unified scheduler by using the first standard scheduler; and a second sending unit, configured to send the second downlink channel information to the unified scheduler by using the second standard scheduler.

This embodiment of this application adds an operation after obtaining the first downlink channel information of the first UE and the second downlink channel information of the second UE, making the operations more comprehensive and improving operability of the embodiments of this application.

In a fourth embodiment of the second aspect of this application, the base station further includes:

a third sending unit, configured to send the scheduling result to the first standard scheduler and the second standard scheduler by using the unified scheduler; and the scheduling unit includes:

a first scheduling subunit, configured to schedule the first UE by using the first standard scheduler based on the scheduling result; and a second scheduling subunit, configured to schedule the second UE by using the second standard scheduler based on the scheduling result.

This embodiment of this application adds an operation before the base station schedules the first UE and the second UE based on the scheduling result, making the operations more comprehensive and improving operability of the embodiments of this application.

In a fifth embodiment of the second aspect of this application, the determining unit includes:

a determining subunit, configured to determine the scheduling result based on the first downlink channel information, the second downlink channel information, and a scheduling queue.

This embodiment of this application describes how the base station determines the scheduling result, making the embodiments of this application more comprehensive.

According to another aspect of this application, a computer-readable storage medium is provided. The computer-readable storage medium stores an instruction, and when the instruction is run on a computer, the computer is enabled to perform the method according to the foregoing aspects.

According to another aspect of this application, a computer program product including an instruction is provided, and when the computer program product is run on a computer, the computer is enabled to perform the method according to the foregoing aspects.

It can be learned from the foregoing technical solutions that the embodiments of this application have the following advantages: the embodiments of this application provide the cross-standard scheduling method, the method is applied to the base station, the unified scheduler is disposed in the base station, the base station first obtains the first downlink channel information of the first UE and the second downlink channel information of the second UE, where the first UE is UE of the first standard, the second UE is UE of the second standard, the first standard and the second standard have an overlapping coverage range, and the first UE and the second UE exist in the coverage range; then determines the scheduling result by using the unified scheduler based on the first downlink channel information and the second downlink channel information; and finally schedules the first UE and the second UE based on the scheduling result. In the embodiments of this application, by unified scheduling UEs in different standards by using a unified scheduler, space division multiplexing of a spectrum resource is achieved, and different standards may share the spectrum resource, which helps a smooth evolution between standards.

DESCRIPTION OF EMBODIMENTS

Embodiments of this application provide a cross-standard scheduling method and a base station, used for unified scheduling of UEs in different standards by using a unified scheduler, to achieve space division multiplexing of a spectrum resource, where different standards may share the spectrum resource.

In the specification, claims, and accompanying drawings of this application, the terms "first", "second", "third", "fourth", and the like (if existent) are intended to distinguish between similar objects but do not necessarily indicate a specific order or sequence. It should be understood that the data used in such a way are interchangeable in proper circumstances, so that the embodiments described herein can be implemented in other orders than the order illustrated or described herein. Moreover, the terms "include", "contain" and any other variants mean to cover the non-exclusive inclusion, for example, a process, method, system, product, or device that includes a list of operations or units is not necessarily limited to those expressly listed operations or units, but may include other operations or units not expressly listed or inherent to such a process, method, system, product, or device.

Figure 1:
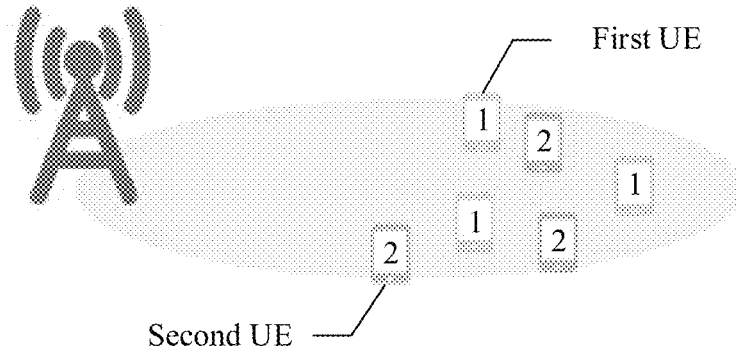
FIG. 1 is a schematic diagram of an application scenario according to an embodiment of this application.

The embodiments of the present invention may be applied to a network architecture as shown in FIG. 1. Two standards, namely, a first standard and a second standard, exist in the network architecture, the first standard and the second standard have an overlapping coverage range, and both first UE of the first standard and second UE of the second standard exist in the coverage range.

Figure 2:
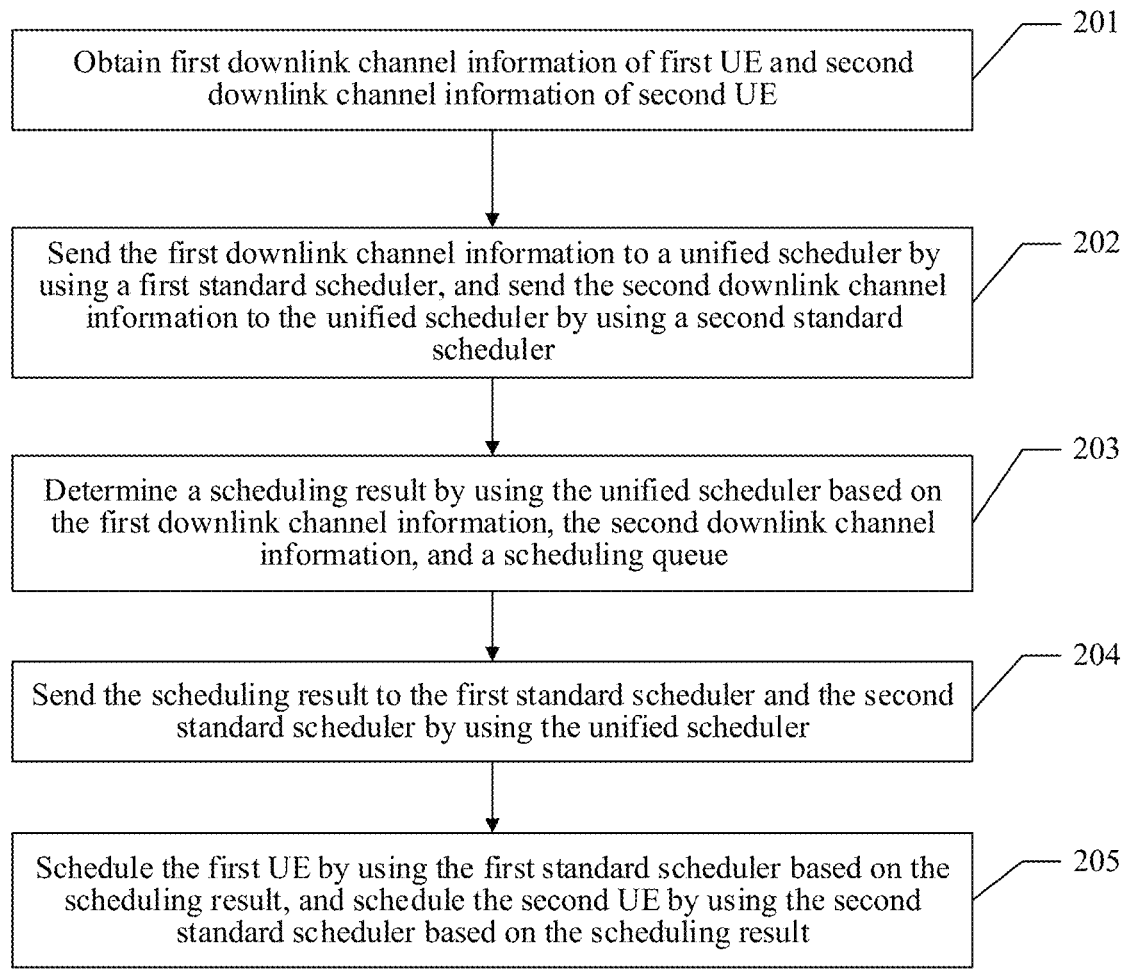
FIG. 2 is a flowchart of an embodiment of a scheduling method according to an embodiment of this application.

Referring to FIG. 2, an embodiment of the cross-standard scheduling method in the embodiments of the present invention includes the following operations.

Operation 201. Obtain first downlink channel information of first UE and second downlink channel information of second UE.

In this embodiment of this application, the base station obtains the first downlink channel information of the first UE and the second downlink channel information of the second UE. The first UE is UE of the first standard, the second UE is UE of the second standard, the first standard and the second standard have an overlapping coverage, and the first UE and the second UE exist in the coverage. A specific procedure is as follows: the first UE sends a sounding reference signal (SRS), and the base station, after receiving the SRS, obtains first downlink channel information by demodulating the SRS, and sends the obtained first downlink channel information to a first standard scheduler disposed in the base station; the second UE sends an SRS, and the base station, after receiving the SRS, obtains second downlink channel information by demodulating the SRS, and sends the obtained second downlink channel information to a second standard scheduler disposed in the base station. The obtaining of downlink channel information based on the SRS is only used in a time division duplex (TDD) system.

It should be noted that, the base station may further obtain the first downlink channel information and the second downlink channel information in another manner. For example, the base station sends a pilot reference signal to the first UE; the first UE sends, after receiving the pilot reference signal, a feedback codebook to the base station; and the base station obtains the first downlink channel information based on the feedback codebook; also, the base station sends a pilot reference signal to the second UE; the second UE sends, after receiving the pilot reference signal, a feedback codebook to the station; and the base station obtains the second downlink channel information based on the feedback codebook. How to specifically obtain the downlink channel information is not limited herein.

For the TDD system, the downlink channel information may be obtained by using reciprocity of an uplink channel and a downlink channel. To implement multi-user matching between standards, uplink channel information of each standard needs to be obtained if two standards coexist, used for user scheduling. Obtaining of the uplink channel information may be implemented through UE sending an SRS. For two intra-frequency coexisting standards, each standard needs to be prevented from generating interference on an SRS of the other standard. A manner of SRS interference avoidance in this application is described as follows.

Figure 3:
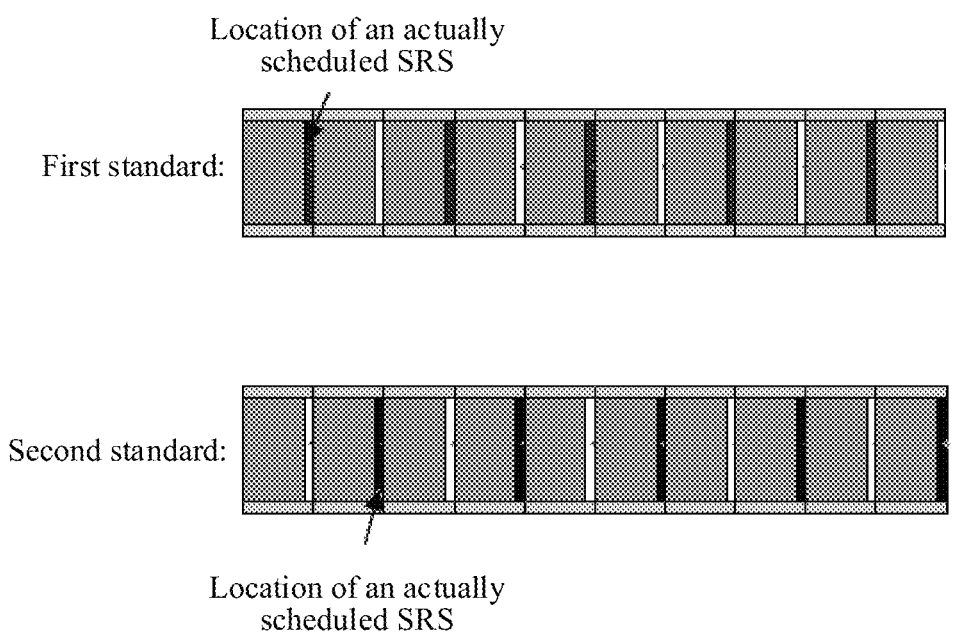
FIG. 3 is a schematic diagram of a configuration location of sounding reference signals (SRS) between different standards according to an embodiment of this application.

As shown in FIG. 3, the first standard may configure a cell-level SRS location. In this case, all UEs in the first standard do not send data on this location. Then, by configuring a UE-level SRS sending location, some cell-level SRS locations may be reserved by unified scheduling for a UE-level SRS location. In this case, a reserved SRS is not occupied in the first standard, so that the second standard may send an SRS at these locations. In this way, the SRS of the second standard is not interfered by the first standard. SRS configuration of the second standard is performed the same processing as that of the first standard, so that SRS sending of the two standards does not interfere with each other, and both standards may obtain accurate downlink channel information.

Interference-free sending of an uplink SRS may alternatively be implemented through frequency hopping of the two standards. That is, the two standards set different frequency hopping patterns, to avoid SRS mutual collision at any time. A specific sending manner is not limited herein.

Operation 202. Send the first downlink channel information to a unified scheduler by using the first standard scheduler, and send the second downlink channel information to the unified scheduler by using the second standard scheduler.

In this embodiment of this application, after obtaining the first downlink channel information, the first standard scheduler sends the first downlink channel information to the unified scheduler disposed in the base station; and after obtaining the second downlink channel information, the second standard scheduler alternatively sends the second downlink channel information to the unified scheduler.

It should be noted that, the unified resource scheduler may alternatively obtain the downlink channel information of UE in the first standard and the second standard directly from the base station, instead of obtaining from the first standard scheduler and the second standard scheduler.

Operation 203. Determine a scheduling result by using the unified scheduler based on the first downlink channel information, the second downlink channel information, and a scheduling queue.

In this embodiment of this application, after obtaining the first downlink channel information and the second downlink channel information, the unified resource scheduler in the base station determines the scheduling result based on the first downlink channel information, the second downlink channel information, and the scheduling queue. The scheduling queue is determined by the unified resource scheduler based on a service requirement of UEs in the first standard and the second standard and a scheduling priority.

It should be noted that, the scheduling result includes channel relevancy and a user weighted value. The unified resource scheduler may determine which UE is preferentially scheduled based on the channel relevancy, and the user weighted value is used to instruct a beam to be sent to specific UE and limit interference from another beam.

It should be noted that the unified scheduler may further perform a channel quality indication (CQI) adjustment. A specific adjusting method may use the prior art, and is not specifically limited herein.

Figure 4:
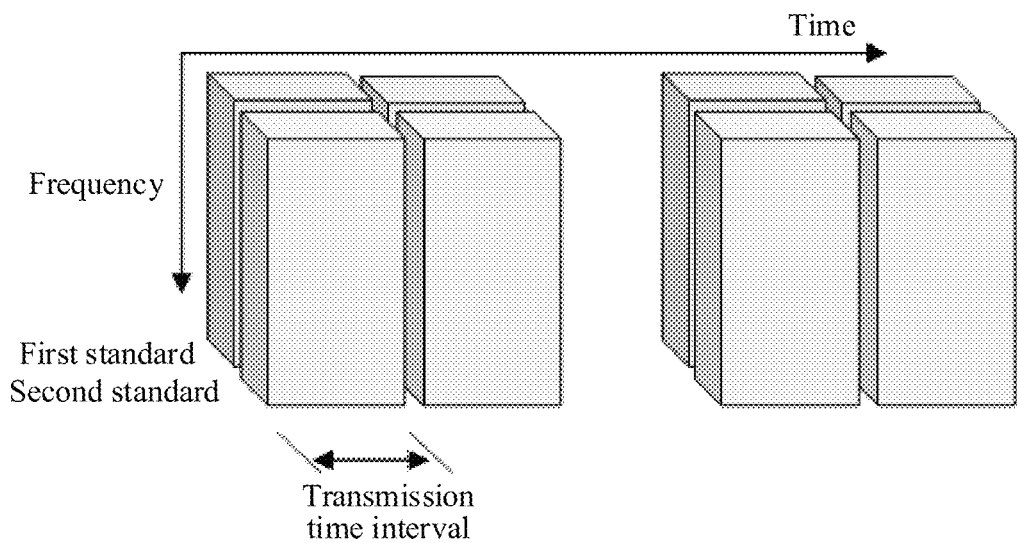
FIG. 4 is a schematic diagram of standards having a same transmission time interval (TTI) according to an embodiment of this application.

As shown in FIG. 4, when data scheduling of the first standard and the second standard has a same transmission time interval (TTI), calculation of the user weighted value may be performed by using an existing linear algorithm such as EZF, DB, SLNR. A specific algorithm process is not described herein.

Figure 5:
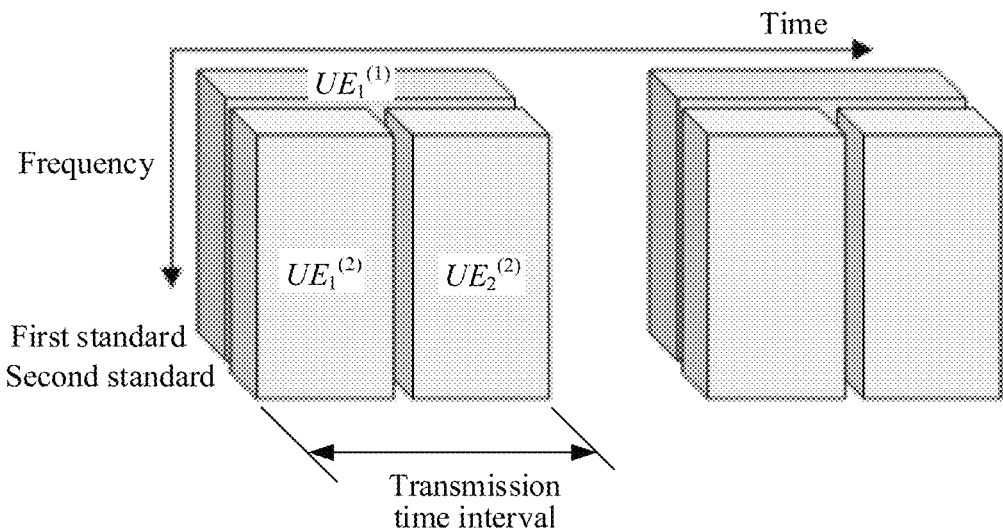
FIG. 5 is a schematic diagram of standards having different TTIs according to an embodiment of this application.

As shown in FIG. 5, when lengths of data scheduling TTIs of the first standard and the second standard are different, calculation of the user weighted value in this case is described herein by using an example in which the TTI of the first standard is longer and the TTI of the second standard is shorter. When the first standard schedules one user $UE_1^{(1)}$ in one TTI, the second standard schedules two users, namely, $UE_1^{(2)}$ and $UE_2^{(2)}$ (where an actually scheduled user is related to a TTI of a specific standard, a scheduling policy, and a quantity of scheduled users). In this case, weighted value calculation of UE; needs to consider both channels of $UE_1^{(2)}$ and $UE_2^{(2)}$, weighted value calculation of $UE_1^{(2)}$ needs to consider only downlink channel information of $UE_1^{(1)}$ and does not need to consider downlink channel information of $UE_2^{(2)}$, and a same condition is applicable to $UE_2^{(2)}$. Therefore, the weighted value calculation in this case is different from a case in which the TTI is the same.

Assuming that a channel participating in user matching of the first standard is:

$$H^{(1)} = [(H_1^{(1)H} \ldots H_k^{(1)H} \ldots H_k^{(1)H}]^H,$$

where k is a quantity of users scheduled by the first standard, a channel participating in user matching of the second standard in one TTI of the first standard is:

$$H^{(2)} = [H_{11}^{(1)H} \ldots H_{1l}^{(1)H} \ldots H_{1L_1}^{(1)H} \ldots H_{t1}^{(2)H} \ldots \\ H_{tL_1}^{(2)H} \ldots H_{T1}^{(2)H} \ldots H_{TL_T}^{(2)H}],$$

where T is a quantity of TTIs that may be scheduled by the second standard in the TTI of the first standard, and $L_t$ is a quantity of users that may be scheduled by the second standard in a $t^{th}$ TTI. Taking block diagonalization weighted value calculation as an example, weighted value calculation of a user k of the first standard is defined as follows:

$$\hat{H}_k^{(1)} = \\ [H_1^{(1)H} \ldots H_{k-1}^{(1)H} \quad H_{k+1}^{(1)H} \ldots H_K^{(1)H} \\ H_{11}^{(1)H} \ldots H_{1l}^{(1)H} \ldots H_{1L_1}^{(1)H} \ldots H_{t1}^{(2)H} \ldots H_{tL_1}^{(2)H} \ldots H_{T1}^{(2)H} \ldots H_{TL_T}^{(2)H}]^H,$$

and $$\hat{H}_k^{(1)} = \hat{U}_k \hat{\Sigma}_k \hat{V}_k,$$

where $\hat{V}_k = [\hat{V}_k^{(1)}, \hat{V}_k^{(0)}]$, $\hat{V}_k^{(0)}$ is a right null space of $\hat{H}_k^{(1)}$, and column vectors of $\hat{V}_k^{(0)}$ form a weighted matrix of the user k of the first standard.

For a user l scheduled on the $t^{th}$ TTI of the second standard, only a user channel matrix in the TTI of the first standard and the user in the $t^{th}$ TTI of the second standard need to participate in weighted value calculation. That is:

$$\hat{H}_{tl}^{(2)} = [H_1^{(1)H} \ldots H_k^{(1)H} \ldots H_K^{(1)H} H_{t1}^{(2)H} \ldots \\ H_{t(l-1)}^{(2)H} \ldots H_{t(l+1)}^{(2)H} \ldots H_{tL_t}^{(2)H}]^H, \text{ and}$$

$$\hat{H}_{tl}^{(2)} = \hat{U}_{tl} \hat{\Sigma}_{tl} \hat{V}_{tl},$$

where $\hat{V}_{tl} = [\hat{V}_{tl}^{(1)}, \hat{V}_{tl}^{(0)}]$, $\hat{V}_{tl}^{(0)}$ II is a right null space of $\hat{H}_{tl}^{(2)}$, and column vectors of $\hat{V}_{tl}^{(0)}$ form a weighted matrix of the user l on the $t^{th}$ TTI of the second standard.

Operation 204. Send the scheduling result to the first standard scheduler and the second standard scheduler by using the unified scheduler.

In this embodiment, after determining the scheduling result, the unified scheduler in the base station delivers the scheduling result to the first standard scheduler and the second standard scheduler.

Operation 205. Schedule the first UE by using the first standard scheduler based on the scheduling result, and schedule the second UE by using the second standard scheduler based on the scheduling result.

In this embodiment, after the first standard scheduler and the second standard scheduler receive the scheduling result delivered by the unified scheduler, the first standard scheduler schedules UE in the first standard based on the scheduling result, and the second standard scheduler also schedules UE in the second standard based on the scheduling result.

It should be noted that, the unified resource scheduler may alternatively directly schedule the UE in the first standard and the UE in the second standard, and does not need to deliver the scheduling result again to the first standard scheduler and the second standard scheduler.

In the technical solutions provided by this embodiment of this application, the unified scheduler is disposed in the base station, the base station first obtains the first downlink channel information of the first UE and the second downlink channel information of the second UE, where the first UE is UE of the first standard, the second UE is UE of the second standard, the first standard and the second standard have an overlapping coverage range, and the first UE and the second UE exist in the coverage range; then determines the scheduling result by using the unified scheduler based on the first downlink channel information and the second downlink channel information; and finally schedules the first UE and the second UE based on the scheduling result. In this embodiment of this application, by unified scheduling UEs in different standards by using a unified scheduler, space division multiplexing of a spectrum resource is achieved, and different standards may share the spectrum resource, which helps a smooth evolution between standards.

Figure 6:
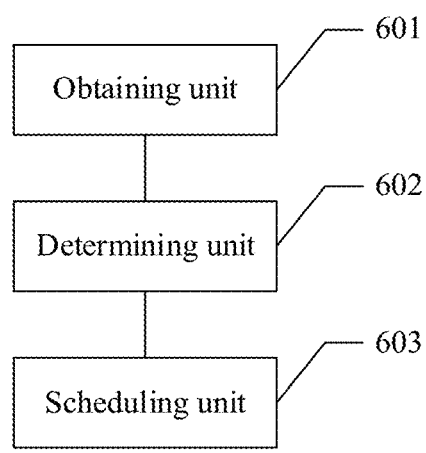
FIG. 6 is a schematic diagram of a base station according to an embodiment of this application.

Referring to FIG. 6, FIG. 6 is a base station according to an embodiment of this application. A unified scheduler is disposed in the base station, and the base station includes:

an obtaining unit 601, configured to obtain first downlink channel information of first user equipment (UE) and second downlink channel information of second UE, where the first UE is UE of a first standard, the second UE is UE of a second standard, the first standard and the second standard have an overlapping coverage, and the first UE and the second UE exist in the coverage;

a determining unit 602, configured to determine a scheduling result by using the unified scheduler based on the first downlink channel information and the second downlink channel information; and a scheduling unit 603, configured to schedule the first UE and the second UE based on the scheduling result.

In the embodiments of this application, by unified scheduling UEs in different standards by using a unified scheduler, space division multiplexing of a spectrum resource is achieved, and different standards may share the spectrum resource, which helps a smooth evolution between standards.

In the technical solutions provided by this embodiment of this application, the unified scheduler is disposed in the base station, the base station first obtains the first downlink channel information of the first UE and the second downlink channel information of the second UE by using the obtaining unit 601, where the first UE is UE of the first standard, the second UE is UE of the second standard, the first standard and the second standard have an overlapping coverage range, and the first UE and the second UE exist in the coverage range; the determining unit 602 determines the scheduling result by using the unified scheduler based on the first downlink channel information and the second downlink channel information; and the scheduling unit 603 schedules the first UE and the second UE based on the scheduling result. In the embodiments of this application, by unified scheduling UEs in different standards by using a unified scheduler, space division multiplexing of a spectrum resource is achieved, and different standards may share the spectrum resource, which helps a smooth evolution between standards.

Figure 7:
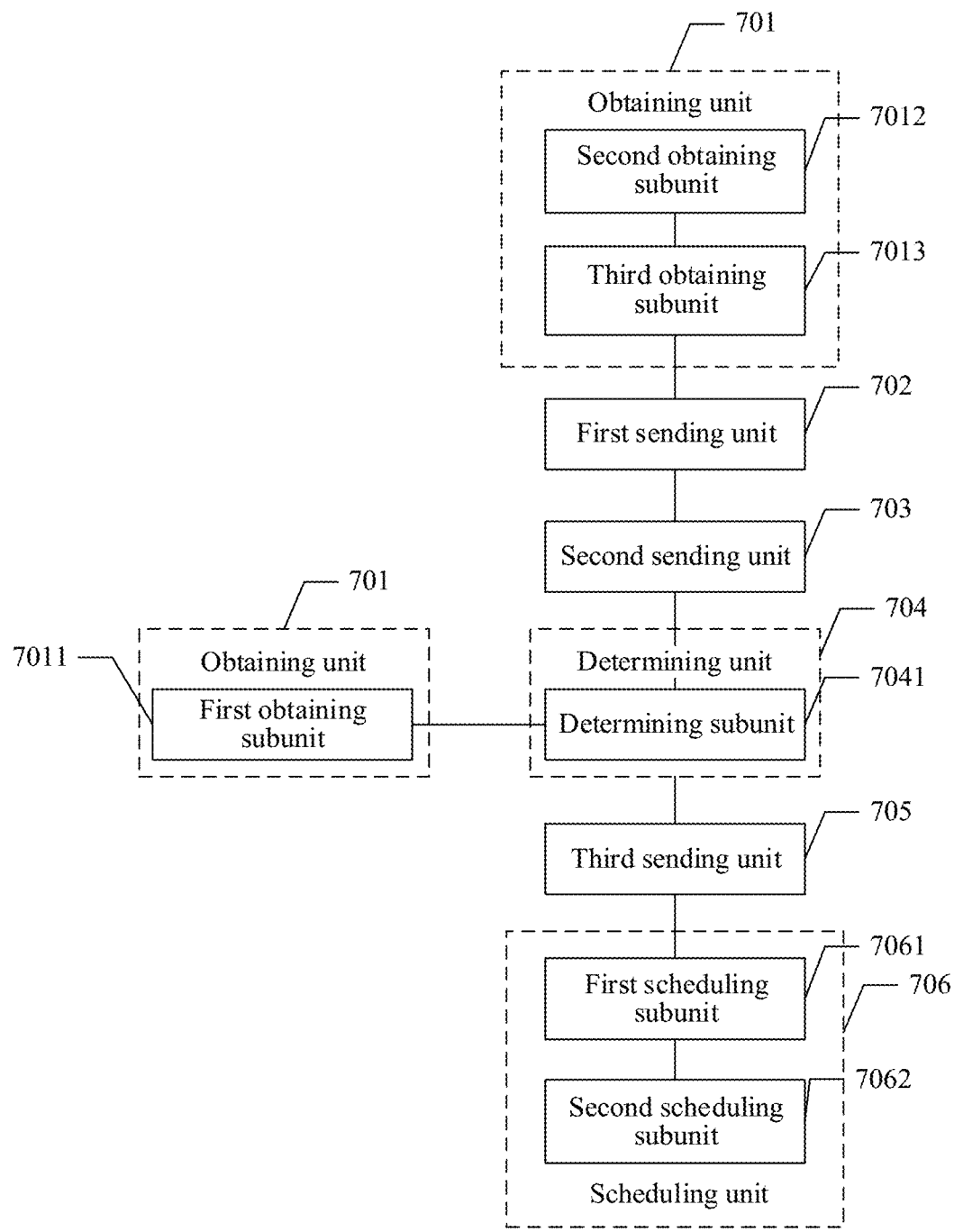
FIG. 7 is a schematic diagram of a base station according to another embodiment of this application.

Referring to FIG. 7, FIG. 7 is a base station according to another embodiment of this application. A unified scheduler, a first standard scheduler, and a second standard scheduler are disposed in the base station, and the base station includes:

an obtaining unit 701, configured to obtain first downlink channel information of first user equipment (UE) and second downlink channel information of second UE, where the first UE is UE of a first standard, the second UE is UE of a second standard, the first standard and the second standard have an overlapping coverage, and the first UE and the second UE exist in the coverage, where the obtaining unit 701 includes:

a first obtaining subunit 7011, configured to obtain the first downlink channel information and the second downlink channel information by using the unified scheduler, or a second obtaining subunit 7012, configured to obtain the first downlink channel information by using the first standard scheduler; and a third obtaining subunit 7013, configured to obtain the second downlink channel information by using the second standard scheduler;

a first sending unit 702, configured to send the first downlink channel information to the unified scheduler by using the first standard scheduler;

a second sending unit 703, configured to send the second downlink channel information to the unified scheduler by using the second standard scheduler;

a determining unit 704, configured to determine a scheduling result by using the unified scheduler based on the first downlink channel information and the second downlink channel information, where the determining unit 704 includes:

a determining subunit 7041, configured to determine the scheduling result based on the first downlink channel information, the second downlink channel information, and a scheduling queue.

a third sending unit 705, configured to send the scheduling result to the first standard scheduler and the second standard scheduler by using the unified scheduler; and a scheduling unit 706, configured to schedule the first UE and the second UE based on the scheduling result, where the scheduling unit 706 includes:

a first scheduling subunit 7061, configured to schedule the first UE by using the first standard scheduler based on the scheduling result; and a second scheduling subunit 7062, configured to schedule the second UE by using the second standard scheduler based on the scheduling result.

In this embodiment of this application, by unified scheduling UEs in different standards by using a unified scheduler, space division multiplexing of a spectrum resource is achieved, and different standards may share the spectrum resource, which helps a smooth evolution between standards.

Figure 8:
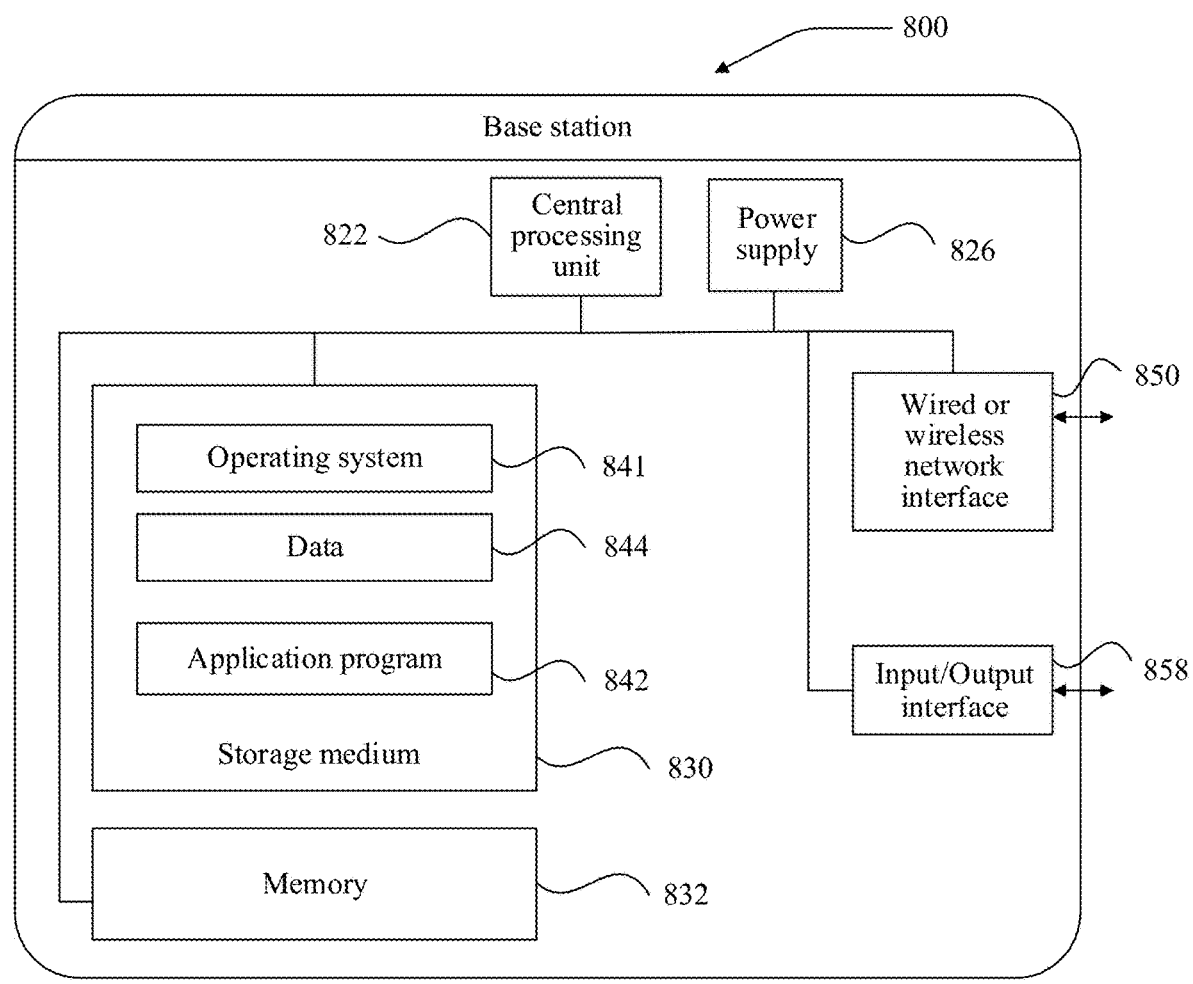
FIG. 8 is a schematic diagram of a base station according to another embodiment of this application.

Referring to FIG. 8, FIG. 8 is a base station according to another embodiment of this application.

FIG. 8 is a schematic structural diagram of a base station according to an embodiment of the present invention. The base station 800 may be greatly different due to different configuration or performances, and may include one or more central processing units (CPU) 822 (for example, one or more processors), a memory 832, and one or more storage mediums 830 (for example, one or more mass storage devices) that store an application program 842 or data 844. The memory 832 and the storage medium 830 may be transient storage or persistent storage. The program stored in the storage medium 830 may include one or more modules (not shown in the figure), and each module may include a series of instruction operations in the base station. Further, the central processing unit 822 may be configured to communicate with the storage medium 830, and perform a series of instruction operations stored in the storage medium 830 on the base station 800.

The base station 800 may further include one or more power supplies 826, one or more wired or wireless network interfaces 850, one or more input/output interfaces 858, and/or one or more operating systems 841, such as a Windows Server™ Mac OS X™, Unix™, Linux™, FreeBSD™, and the like.

The operations performed by a base station in the foregoing embodiment may be based on the structure of the base station shown in FIG. 8.

All or some of the foregoing embodiments may be implemented by means of software, hardware, firmware, or any combination thereof. When software is used to implement the embodiments, the embodiments may be implemented completely or partially in a form of a computer program product.

The computer program product includes one or more computer instructions. When the computer program instructions are loaded and executed on a computer, the procedure or functions according to the embodiments of the present invention are all or partially generated. The computer may be a general-purpose computer, a special-purpose computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, and microwave, or the like) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and there may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing embodiments are merely intended for describing the technical solutions of this application, but not for limiting this application. Although this application is described in detail with reference to the foregoing embodiments, a person of ordinary skill in the art should understand that they may still make modifications to the technical solutions described in the foregoing embodiments or make equivalent replacements to some technical features thereof, as long as such modifications or replacements do not cause the essence of corresponding technical solutions to depart from the spirit and scope of this application.

What is claimed is:

1. A method of cross-standard scheduling, comprising:
    obtaining, by a base station, first downlink channel information of a first user equipment (UE) and second downlink channel information of a second UE, wherein the first UE is a UE of a first standard, the second UE is a UE of a second standard, the first standard and the second standard have an overlapping coverage, and the first UE and the second UE exist in the overlapping coverage;
    determining, by a unified scheduler of the base station, a scheduling result based on the first downlink channel information and the second downlink channel information; and
    scheduling, by the base station, the first UE and the second UE based on the scheduling result.

2. The method according to claim 1, wherein obtaining, by the base station, the first downlink channel information of the first UE and the second downlink channel information of the second UE comprises:
    obtaining, by the unified scheduler, the first downlink channel information and the second downlink channel information.

3. The method according to claim 1, wherein obtaining, by the base station, the first downlink channel information of the first UE and the second downlink channel information of the second UE comprises:
    obtaining, by a first standard scheduler of the base station, the first downlink channel information; and
    obtaining, by a second standard scheduler of the base station, the second downlink channel information.

4. The method according to claim 3, further comprising:
    sending, by the first standard scheduler, the first downlink channel information to the unified scheduler; and
    sending, by the second standard scheduler, the second downlink channel information to the unified scheduler.

5. The method according to claim 3, further comprising:
    sending, by the unified scheduler, the scheduling result to the first standard scheduler and the second standard scheduler; and
    scheduling, by the base station, the first UE and the second UE based on the scheduling result comprises:
    scheduling, by the first standard scheduler, the first UE based on the scheduling result; and
    scheduling, by the second standard scheduler, the second UE based on the scheduling result.

6. The method according to claim 1, wherein determining, by the unified scheduler of the base station, the scheduling result based on the first downlink channel information and the second downlink channel information comprises:
    determining, by the unified scheduler, the scheduling result based on the first downlink channel information, the second downlink channel information, and a scheduling queue.

7. The method of claim 1, wherein the scheduling result comprises channel relevancy and a user weighted value of the first UE and the second UE, wherein the channel relevancy determines which of the first UE and the second UE is preferentially scheduled, and the user weighted value determines a beam to be transmitted to the first UE or the second UE to allow space division multiplexing of a spectrum resource between the first UE and the second UE.

8. An apparatus of a base station, the apparatus comprising:
    a unified scheduler;
    at least one processor; and
    a memory storing instructions executable by the at least one processor, wherein the instructions instruct the at least one processor to perform operations comprising:
        obtaining first downlink channel information of a first user equipment (UE) and second downlink channel information of a second UE, wherein the first UE is a UE of a first standard, the second UE is a UE of a second standard, the first standard and the second standard have an overlapping coverage, and the first UE and the second UE exist in the overlapping coverage;
        configuring the unified scheduler to determine a scheduling result based on the first downlink channel information and the second downlink channel information; and
        scheduling the first UE and the second UE based on the scheduling result.

9. The apparatus according to claim 8, wherein obtaining the first downlink channel information of the first UE and the second downlink channel information of the second UE further comprises:
    configuring the unified scheduler to obtain the first downlink channel information and the second downlink channel information.

10. The apparatus according to claim 8, further comprising a first standard scheduler and a second standard scheduler, and wherein obtaining the first downlink channel information of the first UE and the second downlink channel information of the second UE further comprises:
    configuring the first standard scheduler to obtain the first downlink channel information; and
    configuring the second standard scheduler to obtain the second downlink channel information.

11. The apparatus according to claim 10, the operations further comprising:
    configuring the first standard scheduler to send the first downlink channel information to the unified scheduler; and
    configuring the second standard scheduler to send the second downlink channel information to the unified scheduler.

12. The apparatus according to claim 10, wherein the operations further comprising:
    configuring the unified scheduler to send the scheduling result to the first standard scheduler and the second standard scheduler;
    configuring the first standard scheduler to schedule the first UE based on the scheduling result; and
    configuring the second standard scheduler to schedule the second UE based on the scheduling result.

13. The apparatus according to claim 8, wherein configuring the unified scheduler to determine the scheduling result based on the first downlink channel information and the second downlink channel information, further comprises:
    configuring the unified scheduler to determine the scheduling result based on the first downlink channel information, the second downlink channel information, and a scheduling queue.

14. The apparatus according to claim 8, wherein the scheduling result comprises channel relevancy and a user weighted value of the first UE and the second UE, wherein the channel relevancy determines which of the first UE and the second UE is preferentially scheduled, and the user weighted value determines a beam to be transmitted to the first UE or the second UE to allow space division multiplexing of a spectrum resource between the first UE and the second UE.

15. A non-transitory computer readable medium for a base station that comprises a unified scheduler and at least one processor, wherein the non-transitory computer readable medium stores program code executable by the at least one processor, wherein the program code, when executed by the at least one processor, causes the at least one processor to perform operations comprising:
    obtaining first downlink channel information of a first user equipment (UE) and second downlink channel information of a second UE, wherein the first UE is a UE of a first standard, the second UE is a UE of a second standard, the first standard and the second standard have an overlapping coverage, and the first UE and the second UE exist in the overlapping coverage;
    configuring the unified scheduler to determine a scheduling result based on the first downlink channel information and the second downlink channel information; and
    scheduling the first UE and the second UE based on the scheduling result.

16. The non-transitory computer readable medium according to claim 15, the operations further comprising:
    configuring the unified scheduler to obtain the first downlink channel information and the second downlink channel information.

17. The non-transitory computer readable medium according to claim 15, wherein the base station further comprises a first standard scheduler and a second standard scheduler, and the operations further comprising:
    configuring the first standard scheduler to obtain the first downlink channel information; and
    configuring the second standard scheduler to obtain the second downlink channel information.

18. The non-transitory computer readable medium according to claim 17, the operations further comprising:
    configuring the first standard scheduler to send the first downlink channel information to the unified scheduler; and
    configuring the second standard scheduler to send the second downlink channel information to the unified scheduler.

19. The non-transitory computer readable medium according to claim 17, the operations further comprising:
    configuring the unified scheduler to send the scheduling result to the first standard scheduler and the second standard scheduler;

configuring the first standard scheduler to schedule the first UE based on the scheduling result; and
configuring the second standard scheduler to schedule the second UE based on the scheduling result.

20. The non-transitory computer readable medium according to claim 15, the operations further comprising:
configuring the unified scheduler to determine the scheduling result based on the first downlink channel information, the second downlink channel information, and a scheduling queue.

* * * * *